United States Patent [19]

Reich et al.

[11] 4,424,327
[45] Jan. 3, 1984

[54] CYANOACRYLATE ADHESIVE COMPOSITION

[75] Inventors: Karl Reich, Carlsberg; Heinz Tomaschek, Heidelberg, both of Fed. Rep. of Germany; Georg Busch, Saphorin-sur-Morges, Switzerland

[73] Assignee: Terason GmbH, Heidelberg, Germany

[21] Appl. No.: 242,510

[22] Filed: Mar. 10, 1981

[30] Foreign Application Priority Data

Mar. 10, 1980 [AT] Austria .................. 1320/80

[51] Int. Cl.³ .................. C08F 4/32; C08F 22/32
[52] U.S. Cl. .................. 526/297; 526/204; 526/209; 526/217; 526/220; 526/222
[58] Field of Search .................. 521/27; 526/297, 204, 526/209, 217, 220, 222

[56] References Cited

U.S. PATENT DOCUMENTS

| | | | |
|---|---|---|---|
| 2,327,080 | 8/1943 | Wolper | 526/297 |
| 3,652,635 | 3/1972 | Kawamura et al. | 526/297 |
| 3,922,449 | 11/1975 | Bolger | 526/297 |
| 4,007,077 | 2/1977 | Yaguchi | 526/297 |
| 4,069,378 | 1/1978 | DeMarco | 526/209 |
| 4,139,693 | 2/1979 | Schoenberg | 526/297 |
| 4,170,585 | 10/1979 | Motegi et al. | 260/31.4 R |

FOREIGN PATENT DOCUMENTS 744018  6/1980  U.S.S.R. .................. 526/297

*Primary Examiner*—Joseph L. Schofer
*Assistant Examiner*—Peter Kulkosky
*Attorney, Agent, or Firm*—Howard J. Troffkin

[57] ABSTRACT

A rapid setting α-cyanoacrylate based adhesive composition having an improved polymerization catalyst therein. The polymerization catalyst is composed of at least one 2 arm pod and compound of the general formula

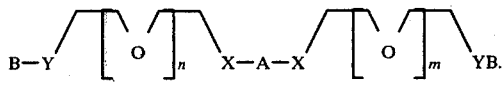

9 Claims, No Drawings

CYANOACRYLATE ADHESIVE COMPOSITION

BACKGROUND OF INVENTION

The present invention relates to a rapid-setting α-cyanoacrylate based adhesive compositon having good storage stability and, in particular, to an adhesive composition having a very fast setting time on wood and other substrates with a porous/acid surface.

α-cyanoacrylates of general formula

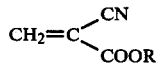
II are rapid-setting adhesives which are ideally suited for the adhesion of a large number of materials. The parts can be joined in an extremely short time of only a few seconds and the adhesive joints produced in this way have good mechanical strength characteristics. The adhesives are hardened by anionic polymerization initiated by even small traces of extremely weak basic-acting compounds (Lewis bases) such as, for example, water or methanol.

When using such α-cyanoacrylates adhesives on wood, leather and other porous/acid surfaces, there is the problem that the anionic polymerization of the α-cyanoacrylate is inhibited in spite of the high moisture content which should in fact aid the polymerization. As a result, the adhesive setting time is too long for practical use. In addition, such adhesives tend to penetrate the pores of the surfaces to be adhered to one another, so that in the case of porous material, the strength of the adhesive joint is impaired due to the protracted setting time.

However, because the distinct advantage of α-cyanoacrylate based adhesives is their short setting time, numerous measures have been attempted to reduce the setting times on wood and similar materials. One of these measures involves treating one of the wood surfaces to be joined with a primer and the other with an α-cyanoacrylate adhesive composition. Polymerization occurs on contacting the treated surfaces together. The required added operration of applying a primer is a serious disadvantage to such process. Another measure involves reducing the quantity of acid stabilizers present for satisfactory storage stability of the α-cyanoacrylate adhesive compositions. However, although this reduces the setting time, such adhesive compositions have an increased tendency to prematurely harden during storage.

Therefore, polymerization catalysts have been proposed which are suitable for use in single-component systems and which reduce the setting times of such α-cyanoacrylate adhesives without excessively impairing their storage stability. According to DE-OS No. 2,816,836 the setting time of α-cyanoacrylate adhesives is reduced by adding to the adhesive composition approximately 0.1 ppm or more of a macrocyclic polyether compound from the group of macrocyclic polyethers and their analogs. The most serious disadvantage of such accelerators relates to their synthesis which, even when the dilution principle is used, only supplies the desired product in low yields, because the tendency to produce intermolecular linkages which form chains is greater than that for intramolecular linkages which form macrocycles. Further, U.S. Pat. No. 4,170,585 suggests the addition of approximately 0.0001 to 20% by weight of a polyethylene glycol with a degree of polymerization of at least 3 or a non-ionic surfactant with a polyethyleneoxy content (degree of polymerization also at least 3) or mixtures thereof to α-cyanoacrylate based adhesive compositions. These compounds, however, have the disadvantage in that they have a great tendency to contain water and low molecular weight polyethylene glycol ether which are difficult to remove and spontaneously initiate polymerization when the compounds are added to α-cyanoacrylates.

The two specifications discussed above also describe in details the disadvantages commonly associated with α-cyanoacrylate adhesives when used on wood, leather and other porous/acid surfaces as mentioned above.

It has now been surprisingly found that the above difficulties and disadvantages of the prior art polymerization catalysts can be obviated by the use of certain compounds described herein below as polymerization catalysts contained in α-cyanoacrylate-based adhesive compositions. These compounds can be easily prepared in high yield and purity, are free from polymerization-initiating substances, require only limited concentratons in the resulting adhesive compositions based on α-cyanoacrylate and lead to greatly reduced setting times on wood and other porous/acid surfaces. It has also been found that the susceptibility to water can be still further reduced by the addition of suitable compounds described herein below which result in improved storage stability of such adhesive compositions.

DETAILED DESCRIPTION OF INVENTION

The present invention is directed to adhesive compositions based on α-cyanoacrylate and which contain a polymerization catalyst and may contain conventional additives as described herein and in the appended claims.

The generally known α-cyanoacrylates which serve as a basis for the adhesive composition according to the invention are of general formula:

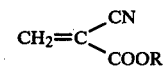
II wherein R is straight or branched-chain alkyl group such as methyl, ethyl, n-propyl, isopropyl, n-butyl, isobutyl, pentyl, hexyl, and the like as well as a halogen atom or alkoxy group substituted alkyl such as 2-chlorethyl, 3-chloropropyl, 2-chlorobutyl, trifluoroethyl, 2-methoxyethyl, 3-methoxybutyl, 2-ethoxyethyl group and the like; a straight or branched-chain alkenyl group such as allyl, methallyl, crotyl and the like; a straight or branched-chain alkinyl group, such as propargyl and the like; cycloalkyl group such as cyclohexyl, and the like; an aryl group, such as benzyl, phenyl and the like; or an aralkyl group, such as cresyl and the like. Further, German published application DE-OS No. 2,816,836 refers to a large number of suitable α-cyanoacrylates which are incorporated herein by reference. The adhesive compositions according to the invention may, in addition, contain conventional additives such as polymerization inhibitors, thickeners, plasticizers, perfumes, dyes, pigments, etc. These additives are conventionally known, form part of the prior art and examples of them are described in the herein above mentioned references.

The subject polymerization catalysts contained in the adhesive compositions according to the invention are open-chain, two-armed podands having two arms containing donor atoms of general formula:

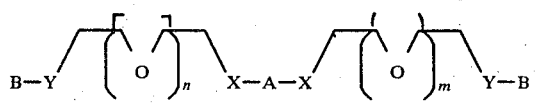

in which X stands for oxygen, sulphur or N—CH$_3$, Y for oxygen, sulphur, N—CH$_3$ or —N— and m and n for integers. In addition, these compounds have a central group A and two short-chain terminal groups B which are free from hydroxyl and amino groups. The arms of the podands are formed from alkylene, such as ethylene or propylene containing donor atoms (atoms having free electron pairs, such as oxygen) and are, preferably, two polyethylene glycol chains. The compounds given in the Table 1 blow are illustrative of groups and compounds found particularly suitable according to the invention.

TABLE 1

| Central group A | X | Y | Terminal group B | Compound class | Synthesis |
|---|---|---|---|---|---|
| —CH₂— | O | O | CH₃— | Formaldehyde-bis-(polyethylene glycol monoether)-acetal | Transesterification of formaldehyde dimethyl acetal |
| —CH₂—CH₂— | O | O | CH₃—, phenyl, o-methoxyphenyl, o-nitrophenyl | Polyethylene glycol diether | Etherification according to Williamson |
| —CH₂—CH₂— | O | —N— | phthalimidoyl | α,ω,bis-(phthalimidoyl)-polyethylene glycol ether | Preparation according to the Gabriel synthesis |
| o-phenylene | O | O | CH₃— | | Etherification according to Williamson |

TABLE 1-continued

| Central group A | X | Y | Terminal group B | Compound class | Synthesis |
|---|---|---|---|---|---|
| $O=\overset{\mid}{\underset{\mid}{C}}-$ | O | O | CH₃— | Benzo-condensed polyethylene glycol ether | Diethyl carbonate transesterification. |
| $O=\overset{\mid}{\underset{\mid}{S}}=O$ | N–CH₃ | O | CH₃— | Bis-(polyethylene glycol monoether)-carbonate. | Alkylation of an N'N'-disubstituted sulphamide. |
| $O=\overset{\mid}{\underset{\mid}{P}}-CH_3$ | O | O | CH₃–CH₃–O— | N,N'—bis-(polyethylene glycol monoether)- sulphamide | Reaction of methane phosphonic acid dichloride with polyethylene glycol monomethyl ether in the presence of pyridine. |
|  |  |  |  | Bis-(polyethylene glycol monoether)-methane phosphate. |  |

It is found that the setting time of the adhesive composition of the present invention is influenced by the podand chain length. The setting time is reduced with increased number of units, such as ethylene oxide units in the podand chain as defined by n and m. However if the number of donar atoms, i.e. oxygen, exceeds approximately 50 on each chain, there is no further significant acceleration of adhesion of the α-cyanoacrylate to wood. Therefore, the number of donar atoms $z=n+m+4$ should be between 5 and 100 and preferably between 5 and 50 when used for example on wood. It is further preferred that n and m each has a value of between 2 and 50 and preferably between 3 and 20.

The nature of the central group A of the subject podand compounds can be selected from groups capable of linking the heteroatoms x by one or two atoms. Suitable groups include, for example, divalent alkyl groups of the general formula $(CH_2)_n$ with n being 1 or 2; a divalent aryl group in which the linking bonds are ortho; a carbonyl group

with n being 1 or 2; a sulphonyl group

or a phosphonyl group, such as

The nature of the short-chain terminal groups B also have an important influence on the acceleration of the setting of α-cyanoacrylates obtainable through the use of presently disclosed two-armed podands. Suitable terminal groups are $C_1$ to $C_{12}$ hydrocarbon groups which may have hetero atom associated thereto but are free from hydroxyl and amino groups and are, in particular, $C_1$–$C_4$-alkyl groups and hetero or $C_1$–$C_4$ hydrocarbon substituted or unsubstituted aryl groups with $C_1$–$C_4$-alkyl, phenyl, 1-naphthyl, 2-naphthyl, 2-methoxyphenyl, 2-nitrophenyl, 2-cyanophenyl and 2-methoxycarbonyl groups being particularly suitable. When $Y=-N-$ it has been found that phthaloyl groups are particularly suitable. The hetero atom substituted aryl can have a hetero atom of oxygen, nitrogen, sulphur in the form, for example, of methoxy, carbonyl, nitro and the like.

It has been unexpectedly found that the use of the adhesive compositions containing the polymerization catalyst according to the present invention cancels out the inhibition of polymerization of α-cyanoacrylates when used on wood and other substrates with porous/acid surfaces which otherwise occurs. Due to the advantageous action of the polymerization catalysts presently described, it is only necessary to add small quantities of 0.01 to 10% by weight and preferably 0.01 to 5% by weight (based on the total weight of the adhesive compositions) to the α-cyanoacrylate adhesives to obtain, for example, bonded wood joints with excellent mechanical strength. In the case of all the adhesive joints made and stored at room temperature for 24 hours, the break in the sample material took place in the wood during the tensile and shear strength test. In addition, it has been found that the storage stability of α-cyanoacrylate adhesive compositions is not impaired by adding the polymerization catalysts according to the present invention. Therefore, all the adhesive compositions prepared with the inventive polymerization catalysts could undergo standard accelerated ageing (5 days at 70° C.) without modifying the viscosity and adhesive characteristics.

Advantageously, the two-armed podands used as polymerization catalysts can be introduced into the adhesive compositions according to the invention in the form of a solution formed with an organic solvent. For example, anhydrous aromatic hydrocarbons, such as benzene toluene, xylenes and the like are suitable solvents. It is also possible to use chlorinated hydrocarbons such as methylene chloride, chloroform or carbon tetrachloride without adverse influencing the storage stability. Other particularly suitable organic solvents are formed by the furane derivatives described hereinafter.

The properties of the adhesive compositions according to the invention can be further improved by adding furane derivatives. Suitable furan derivatives are 5-dihydro-5-alkoxy-furan-2-one and 2,5-dialkoxy-2,5-dihydrofuran in accordance with the following general formulas:

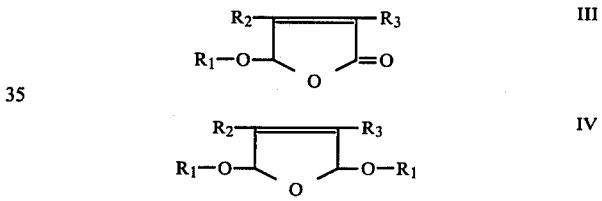

in which each $R_1$ stands for a straight or branched-chain alkyl or alkenyl radical, a cycloalkyl radical, a phenyl radical, a benzyl radical or an acetyl radical and $R_2$ and $R_3$, independently of one another, stand for hydrogen, straight and branched-chain alkyl and alkenyl radicals, cycloalkyl radicals, phenyl radicals, benzyl radicals, acetyl radicals and halogen. Said alkyl, alkenyl, cycloalkyl, phenyl or benzl radicals being those described herein above with respect to the podand compound. Preferably, $R_1$ can stand for a methyl, ethyl, n-propyl, isopropyl, n-butyl, pentyl, hexyl, octyl, dodecyl or cyclohexyl radical and $R_2$ and $R_3$, independently of one another can stand for hydrogen, chlorine, bromine, methyl radicals or phenyl radicals. The preparation of these furane derivatives is known from the literature and can be performed using standard techniques. The adhesive compositions of the present invention can contain approximately 1 ppm to 20% by weight and preferably 10 ppm to 10% by weight of these furane derivatives based on the total weight of the adhesive compositon.

The action of the above-described furane derivatives has been unexpectedly found to consist of a considerable reduction in the susceptibility of the α-cyanoacrylate adhesive compositions to water, leading to an improvement of the storage stability and/or a simplification of storage. It has also been found that the addition of these furane derivatives to many substrates and in particular polyvinyl chloride (PVC), ethylene-propylene-diene (EPDM) and Styrene-Butadiene rubber (SBR) has an adhesion-imparting action. Thus, when producing an adhesive joint which includes the addition of the cocatalyst, migration of the adhesive is avoided through the immediate fixing on the substrate. Finally, the utilization of the cocatalysts offers the potential for subsequently correcting non-optimum charges in such a way that they form a completely satisfactory product.

The following examples are given for illustrative purposes only and are not meant to be a limitation on the subject invention except as defined by the claimed appended hereto. All parts and percentages are by weight unless otherwise indicated.

EXAMPLE 1

Polyethylene glycol-400-dimethyl ether was synthesized by reacting polyethylene glycol 400 with metallic sodium in dioxan and alkylation of the resulting disodium salt with methyl iodide.

For this purpose, 53 g of sodium (2.30 mol) were boiled in 500 ml of absolute 1,4-dioxan and finely dispersed by rapid stirring of the melted sodium. 400 g of polyethylene glycol 400 were added dropwise within a period of 30 minutes to the dispersion in boiling heat. This was followed by refluxing for 3½ hours and the sodium almost completely reacted to the thus formed mixture. 355 g of methyl iodide (2.5 mol) were added dropwise within 30b minutes while stirring and was then refluxed for 1 hour. After cooling, the precipitated sodium iodide was removed by suction and the 1,4-dioxan distilled off. 419 g of crude polyethylene glycol-400-dimethyl ether were left behind as the residue (yellow oil, 98% theory).

347 g of pure polyethylene glycol-400-dimethyl ether were obtained by high vacuum molecular distillation at $10^{-3}$ mbar (colourless oil 81% theory).

An adhesive compositon was prepared from 19.6 g of methyl-2-cyanoacrylate (thickened with 8.7% by weight of polymethyl methacrylate and stabilized wtih 10 ppm of polyphosphoric acid) and 0.4 g of a 50% mixture of polyethylene glycol-400-dimethyl ether in absolute toluene. For comparison purposes, a mixture was prepared without adding the polymerization accelerator.

Using the above-described compositions overlapping adhesive joints were made on test pieces consisting of different wood species. The setting time was considered to be the value in which there is found to be a definite joining of the parts in a tensile test by hand. The results obtained are given in Table 2.

TABLE 2

| Wood Species | Setting time of adhesive mixture at 20° C. in sec. | |
|---|---|---|
| | Without accelerator | With accelerator |
| Balsa | approx. 15 | approx. 1 |
| Limba | approx. 80 | 5-6 |
| Beech | 180-210 | 15-20 |
| Teak | 240-300 | 20-25 |
| Mahogany | 150-180 | 15-20 |
| Spruce | approx. 240 | 15-20 |
| Pine | approx. 360 | 20-25 |
| Oak | approx. 360 | 20-25 |

With all the test pieces, the material break occurred in the wood when subjected to standard tensile tests after storing for 24 hours at room temperature. This behaviour was particularly marked with the soft woods tested, but also existed with the hard woods (beech, oak).

EXAMPLE 2

In order to illustrate the dependence of the setting times on the number of donor atoms in the podands, podands of different chain lengths were synthesized. The setting times of adhesive compositions based on -cyanoacrylate as described in Example 1 above, containing in each case 1% by weight of the podand as the polymerization accelerator, were determined on limba.

TABLE 3

| Podand as accelerator | No. of donor atoms (oxygen) | Setting time of the adhesive mixture containing 1% by weight of the podand on Limba at 20° C. in sec. |
|---|---|---|
| Tetracethylene glycol dimethyl ether | 5 | 15 |
| Polyethylene glycol-400-dimethyl ether | approx. 10 | 5-6 |
| Polyethylene glycol 600 dimethyl ether | approx. 14 | 3-4 |
| Polyethylene glycol 1000-dimethyl ether | approx. 22 | 2-3 |

EXAMPLE 3

Podands with different central groups were synthesized to determine the influence of the central group A. Adhesive compositions as described in Example 1, except based on ethyl-2-cyanoacrylate, were prepared, containing in each case 1% by weight of the podand as the polymerization accelerator and the setting times were determined on limba.

TABLE 4

| Podand as setting accelerator | Setting time of the adhesive mixture containing 1% by weight of the podand on Limba at 20° C. in sec. |
|---|---|
| 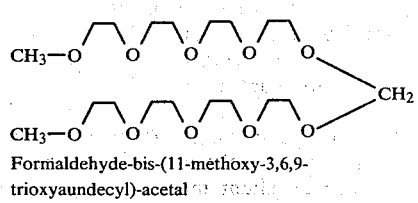 Formaldehyde-bis-(11-methoxy-3,6,9-trioxyaundecyl)-acetal | 5-6 |

TABLE 4-continued

| Podand as setting accelerator | Setting time of the adhesive mixture containing 1% by weight of the podand on Limba at 20° C. in sec. |
|---|---|
| 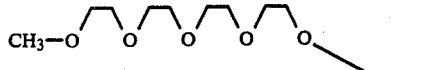 Polyethyl glycol-400-dimethyl ether | 5-6 |
| 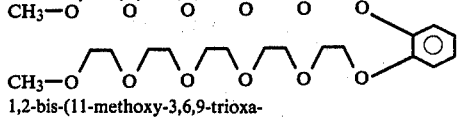 1,2-bis-(11-methoxy-3,6,9-trioxa- undecyloxy-benzol | 7-8 |
| 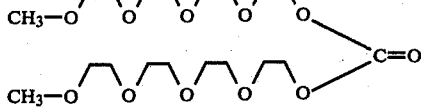 Bis-(11-methoxy-3,6,9-trioxoundecyl)- carbonate | 10 |

EXAMPLE 4

Podands with different terminal groups were synthesized to determine the influence of terminal group B. The setting times on Limba were determined using the same cyanoacrylate adhesive composition, containing, in each case, 1% by weight of the particular podand as the polymerization accelerator as stipulated in Table 5 below.

TABLE 5

| Podand as setting accelerator | Setting time of the adhesive mixture containing 1% by weight of the podand on Limba at 20° C. in sec. |
|---|---|
| 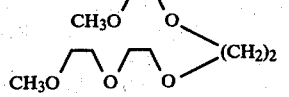 Tetraethylene glycol dimethyl ether | 15 |
| 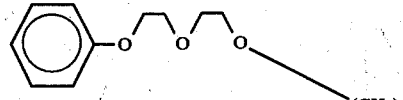 1,4,14-bis-(phenyloxy)-3,6,9,12- tetraoxatetradecane | 30-40 |
| 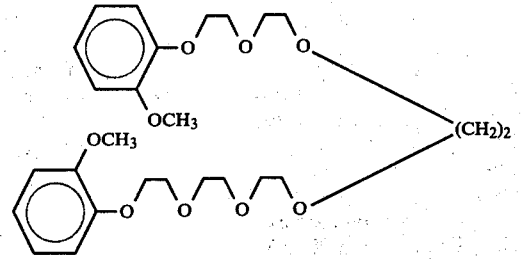 1,11-bis-(2-methoxyphenyloxy)-3,6,9- | 8-10 |

TABLE 5-continued

| Podand as setting accelerator | Setting time of the adhesive mixture containing 1% by weight of the podand on Limba at 20° C. in sec. |
|---|---|
| trioxaundecane | |
| 1,11-bis-(2-nitrophenyloxy)-3,6,9-trioxaundecane | 20 |
| 1,11-bis-(phthalimidoyl)-3,6,9-trioxaundecane | 20 |

While the invention has been described in connection with certain preferred embodiments, it is not intended to limit the invention to the particular form set forth, but, on the contrary, it is intended to cover such alternatives, modifications and equivalents as defined by the appended claims.

What we claim is:

1. An α-cyanoacrylate based adhesive composition having a catalytic amount of polymerization catalyst therein; said polymerization catalyst comprises at least one two-armed podand compound of the general formula:

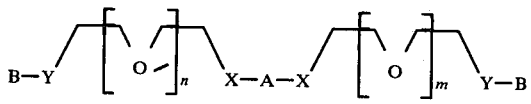

in which X represents an oxygen atom, a sulphur atom or a N—CH$_3$ group; Y represents an oxygen atom, a sulphur atom, a N—CH$_3$ group or a —N—; each B represents a hydrocarbon group free of hydroxy or amino groups which is separately selected from a C$_1$-C$_4$ alkyl, an unsubstituted aryl, a C$_1$-C$_4$ substituted aryl, or a hetero atom stubstituted aryl; A represents a central group capable of linking each X to the other by one or two atoms; and n and m are each integers.

2. The adhesive composition of claim 1 wherein the catalyst therein is at least one two-armed podand compound having each podand chain linking an X to a Y group in the form of a polyalkylene glycol chain.

3. The adhesive composition of claim 1 wherein the catalyst therein is at least one two arm podand compound having each podand chain linking an X to a Y group in the form of a polyethylene glycol chain.

4. The adhesive composition of claim 1 wherein the catalyst therein has a divalent central group, A, selected from —CH$_2$—, —CH$_2$CH$_2$—, arylene, carbonyl, dicarbonyl, sulphonyl or phosphonyl group.

5. The adhesive compositon of claim 1 wherein the catalyst therein has each podand chain length defined by the formula Z=n+m+4 wherein Z is between 5 and 100.

6. The adhesive composition of claim 1 wherein the catalyst therein is a two armed podand compound such that when Y is oxygen or sulphur, each B is independently selected from C$_1$-C$_4$ alkyl, phenyl, 1-naphthyl, 2-naphthyl, 2-methoxyphenyl, 2-nitrophenyl, 2-cyanophenyl or 2-methoxycarbonylphenyl groups and when Y=—N— each terminal B group associated therewith is a phthaloyl group.

7. The adhesive composition of claim 1 wherein said composition contains 0.01 to 10% by weight of 2-armed podands based on the total weight of said adhesive composition.

8. The adhesive composition of claim 1 wherein the polymerization catalyst therein is at least one two-arm podand compound such that each chain is a polyethylene glycol chain; n and m each independently is an integer of from 2 to 50; A is selected from —CH$_2$—, —CH$_2$CH$_2$—, arylene,

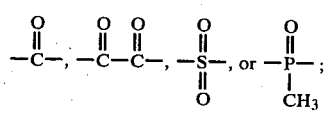

and when Y is selected from oxygen or sulfur.

9. The adhesive composition of claim 1, 2, 3, 4, 5, 6, 7 or 8 α-cyanoacrylate is of the general formula
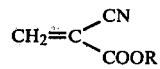
in which R is a straight or branched-chain alkyl which can be substituted with a halogen atom or an alkoxy group, a straight or branched-chain alkenyl group, a straight or branched-chain alkinyl group, a cycloalky group, an aryl group or an aralkyl group.
* * * * *

UNITED STATES PATENT AND TRADEMARK OFFICE
CERTIFICATE OF CORRECTION

PATENT NO. : U.S. Patent No. 4,424,327
DATED : January 3, 1984
INVENTOR(S) : Karl Reich, Heinz Tomaschek and Georg Busch It is certified that error appears in the above-identified patent and that said Letters Patent is hereby corrected as shown below:

On the Cover Page, Item [73] the designated Assignee should be changed from "Terason G.m.b.H." to -- Teroson G.m.b.H. --.

The structural formulas located in the Abstract; at Column 3, line 5; and at Claim 1, line 6, should be deleted and each replaced by:

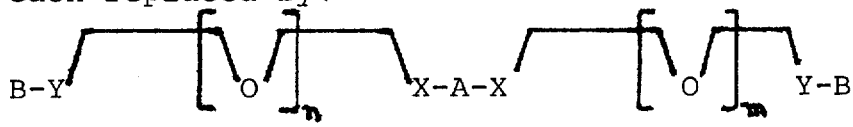

In Claim 8, last line, before "Y is selected" delete "when".

In Claim 9, lines 1 and 2, delete the space between "7" and "or 8".

Signed and Sealed this

Tenth Day of April 1984

[SEAL]

Attest:

Attesting Officer

GERALD J. MOSSINGHOFF
Commissioner of Patents and Trademarks